(12) United States Patent
Richey et al.

(10) Patent No.: US 9,516,874 B2
(45) Date of Patent: Dec. 13, 2016

(54) HUNTING TREE STAND

(71) Applicants: Bryan Richey, Apopka, FL (US); Tony Richey, Apopka, FL (US)

(72) Inventors: Bryan Richey, Apopka, FL (US); Tony Richey, Apopka, FL (US)

(*) Notice: Subject to any disclaimer, the term of this patent is extended or adjusted under 35 U.S.C. 154(b) by 6 days.

(21) Appl. No.: 14/465,187

(22) Filed: Aug. 21, 2014

(65) Prior Publication Data

US 2015/0053503 A1   Feb. 26, 2015

Related U.S. Application Data

(60) Provisional application No. 61/868,176, filed on Aug. 21, 2013.

(51) Int. Cl.
*A01M 31/02* (2006.01)
*E04G 5/06* (2006.01)
*A45F 3/26* (2006.01)

(52) U.S. Cl.
CPC ............ *A01M 31/02* (2013.01); *E04G 5/067* (2013.01); *A45F 3/26* (2013.01)

(58) Field of Classification Search
CPC ............ A01M 31/02; E04G 5/067; A45F 3/26
See application file for complete search history.

(56) References Cited

U.S. PATENT DOCUMENTS

| | | | | |
|---|---|---|---|---|
| 4,150,733 A | * | 4/1979 | Plummer | A45F 3/26 108/121 |
| 4,236,602 A | * | 12/1980 | Leggett | A45F 3/26 182/187 |
| 5,515,943 A | * | 5/1996 | Antonelli | 182/187 |
| 5,848,666 A | * | 12/1998 | Woodall et al. | 182/187 |
| 5,927,437 A | * | 7/1999 | Fast | 182/187 |
| 5,941,484 A | * | 8/1999 | Stepney et al. | 248/201 |
| 6,367,585 B1 | * | 4/2002 | Fast | 182/187 |
| 6,571,916 B1 | * | 6/2003 | Swanson | A01M 31/02 108/152 |
| 7,735,503 B2 | * | 6/2010 | Jenkinson | 135/96 |
| 8,272,479 B1 | * | 9/2012 | Leach | 182/187 |
| 8,522,920 B1 | * | 9/2013 | Salyer et al. | 182/188 |
| 8,556,036 B1 | * | 10/2013 | Meredith | A01M 31/02 182/113 |
| 9,089,125 B1 | * | 7/2015 | Fast | A01M 31/02 |

(Continued)

*Primary Examiner* — Daniel Cahn

(74) *Attorney, Agent, or Firm* — Matthew G. McKinney, Esq.; Allen, Dyer, Doppelt, Milbrath & Gilchrist, P.A.

(57) ABSTRACT

A hunting tree stand is disclosed. The hunting tree stand includes a backbone configured to be secured to a tree, an inner radial support beam having a generally arc shape, and a plurality of cantilevered supports extending outwards from the inner radial support beam. In addition, the hunting tree stand includes a pair of adjustment plates disposed on a respective proximate end of the plurality of cantilevered supports and configured to be secured to opposing sides of a lower end of the backbone. A plurality of adjustment apertures are disposed in a curvilinear pattern on the pair of adjustment plates, where the plurality of adjustment apertures are positioned so that an angle of a decking to the backbone can be adjusted relative to the backbone by rotating the decking downwards or upwards and inserting an adjustment pin through a desired adjustment aperture and the lower end of the backbone.

13 Claims, 5 Drawing Sheets

(56) References Cited

U.S. PATENT DOCUMENTS

| | | | |
|---|---|---|---|
| 2003/0192741 A1* | 10/2003 | Berkbuegler | A01M 31/02 182/187 |
| 2009/0321186 A1* | 12/2009 | Louchart | A01M 31/02 182/188 |
| 2011/0297481 A1* | 12/2011 | Copus | A01M 31/02 182/113 |
| 2011/0308887 A1* | 12/2011 | Johnson | 182/187 |
| 2012/0211306 A1* | 8/2012 | Benefield | 182/115 |
| 2014/0008149 A1* | 1/2014 | Fogel | 182/129 |
| 2014/0202796 A1* | 7/2014 | Sponsler | 182/188 |
| 2015/0034419 A1* | 2/2015 | Blackwell | A01M 31/02 182/187 |
| 2015/0335136 A1* | 11/2015 | Wehner | A45F 3/26 297/273 |

* cited by examiner

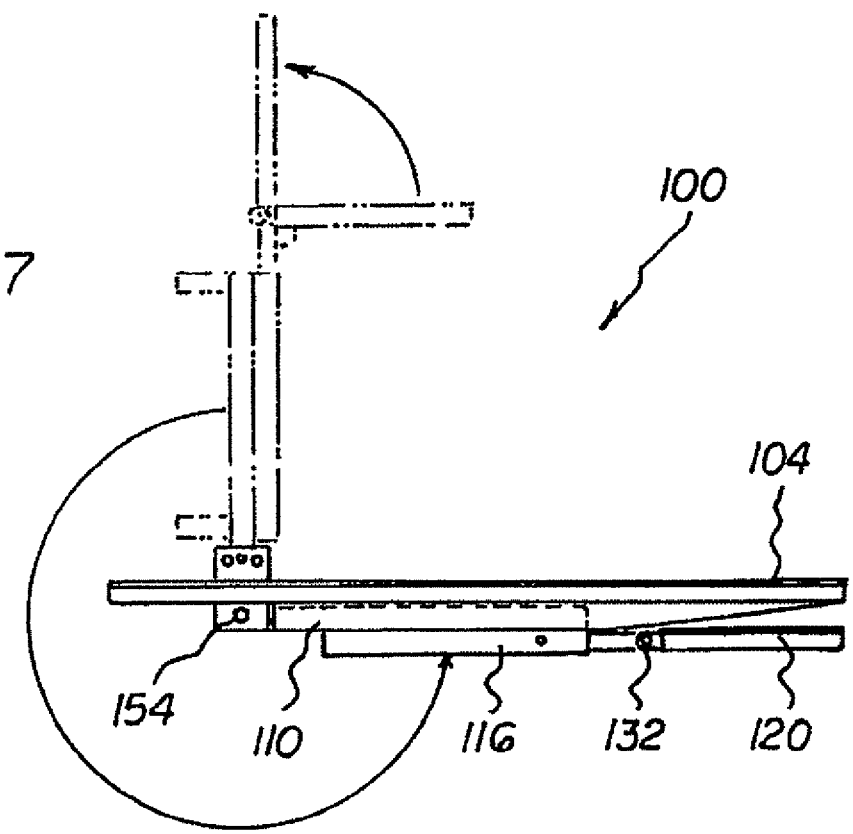
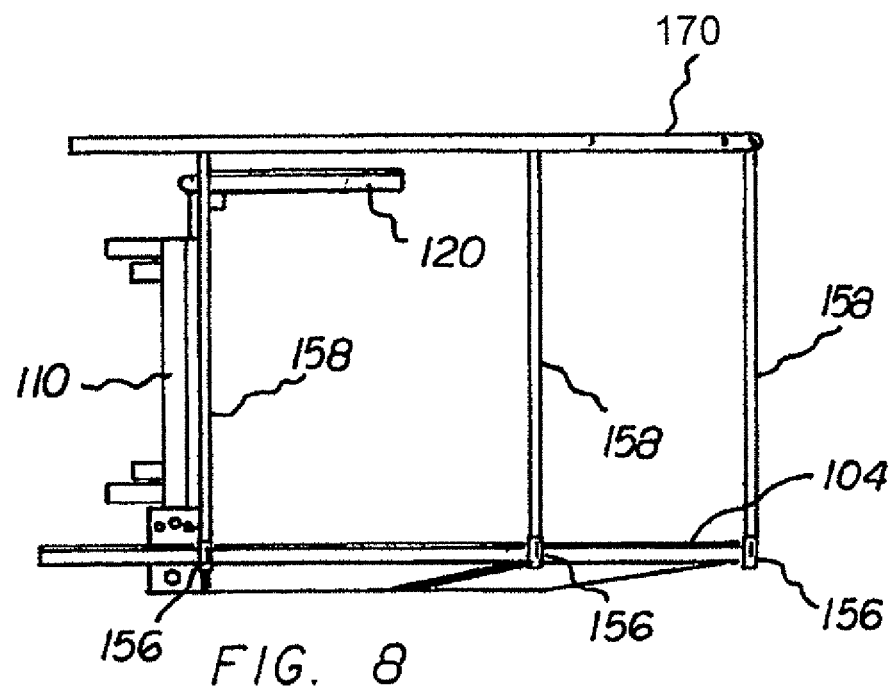

HUNTING TREE STAND

I. CROSS-REFERENCE TO RELATED APPLICATIONS

This application claims the benefit of U.S. Provisional Application No. 61/868,176 filed Aug. 21, 2013. The disclosure of the provisional application is incorporated herein by reference.

II. FIELD

The present disclosure is generally related to a hunting tree stand.

III. DESCRIPTION OF RELATED ART

Hunting tree stands are often used for deer hunting. The tree stand is carried into the woods and secured off the ground to a tree trunk. The elevated platform of the tree stand allows a hunter to stand or sit while waiting for game to approach and to have a good vantage point.

There are many different types of tree stands that are presently available in the marketplace. One such type of tree stand is designed to be supported on the side of the tree trunk in cantilevered fashion. The existing tree stands that are cantilevered out from the tree typically use complex and cumbersome mounting arrangements in an effort to provide a safe and stable platform for the hunter. However, such stands are generally unstable and unsafe when the hunter is moving around in position for a shot. In addition, the cantilevered hunting stands are relatively expensive and not easily transported by the hunter.

For example, the existing cantilevered stands include a horizontal platform that is supported on the tree trunk by chains and large spikes. The platform is held against the tree trunk by hooking one link of a chain to one side of the back portion of the platform and another link of the same chain to the other side of the platform. The large spikes are driven into the tree trunk to keep the platform from slipping down the tree. However, a shortcoming of that type of tree stand is, among other things, that pounding large spikes into the tree trunk is detrimental to the tree. Further, the hunting tree stand requires a relatively straight tree trunk otherwise the platform will be leaning making it uncomfortable and unsafe for the hunter.

Accordingly, there is a need in the art for a cantilevered hunting tree stand that is easy to adjust and install on leaning trees without causing damage to the tree and where the hunting stand includes a wide support platform for increased field of vision for the hunter.

However, in view of the prior art at the time the present invention was made, it was not obvious to those of ordinary skill in the pertinent art how the identified needs could be fulfilled.

IV. SUMMARY

In a particular illustrative embodiment, a hunting tree stand is disclosed. The tree stand includes a backbone configured to be secured to a tree, an inner radial support beam having a generally arc shape, and a plurality of cantilevered supports extending outwards from the inner radial support beam. In addition, the hunting tree stand includes a pair of adjustment plates disposed on a respective proximate end of the plurality of cantilevered supports and configured to be secured to opposing sides of a lower end of the backbone. A decking is secured over the plurality of cantilevered supports, where the decking provides a surface for a hunter to stand. The hunting tree stand also includes a plurality of adjustment apertures disposed in a curvilinear pattern on the pair of adjustment plates, where the plurality of adjustment apertures are positioned so that an angle of the decking to the backbone can be adjusted relative to the backbone by rotating the decking downwards or upwards and inserting an adjustment pin through a desired adjustment aperture and the lower end of the backbone.

Other aspects, advantages, and features of the present disclosure will become apparent after review of the entire application, including the following sections: Brief Description of the Drawings and Detailed Description.

V. BRIEF DESCRIPTION OF THE DRAWINGS

FIG. 7 is an elevational view illustrating the hunting tree stand moving from an installed position to a storage position;

FIG. 8 is an elevational view of a railing installed on the hunting tree stand;

VI. DETAILED DESCRIPTION

Figure 1:
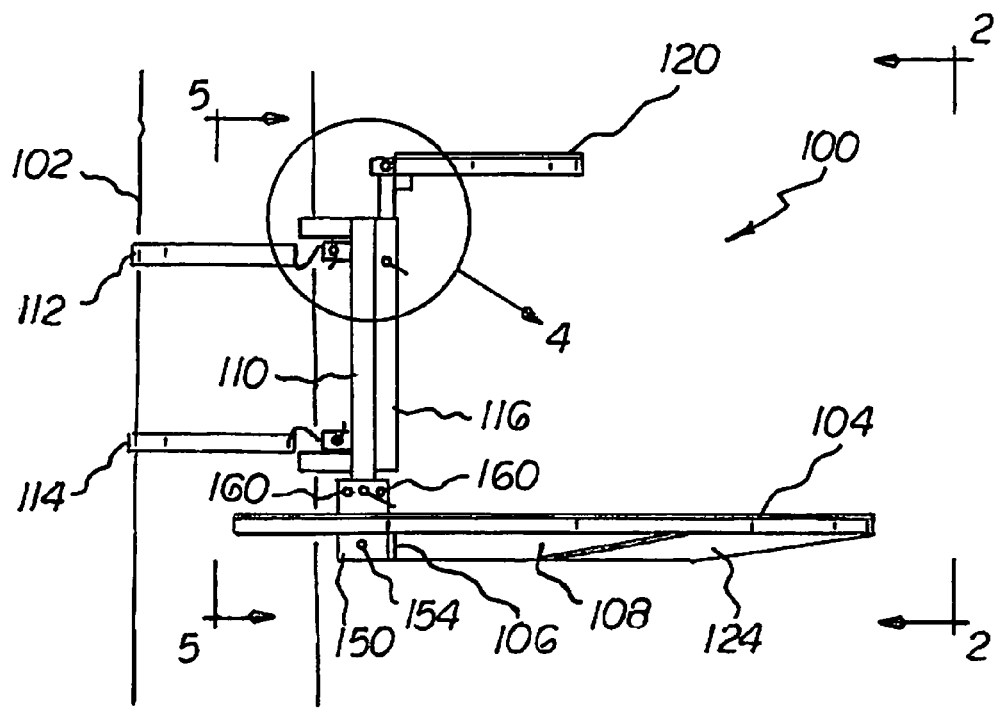
FIG. 1 is an elevational view of a particular illustrative embodiment of a hunting tree stand installed on a tree trunk.

A first particular illustrative embodiment of a hunting tree stand is disclosed in FIG. 1 and generally designated 100. The hunting tree stand 100 is adapted to be installed on various sizes of trees 102. In particular, the tree stand 100 is installed elevated off the ground to provide a vantage point for a hunter. Accordingly, the hunting stand 100 needs to be very secure to prevent the hunter from accidentally falling off the stand 100. Further, the hunting tree stand 100 is intended to provide increased vision for the hunter by having the decking 104 extending 180 degrees around the tree 102. However, in alternative embodiments, the decking 104 may be increased to be all the way around the tree 102 or less than 180 degrees.

Figure 2:
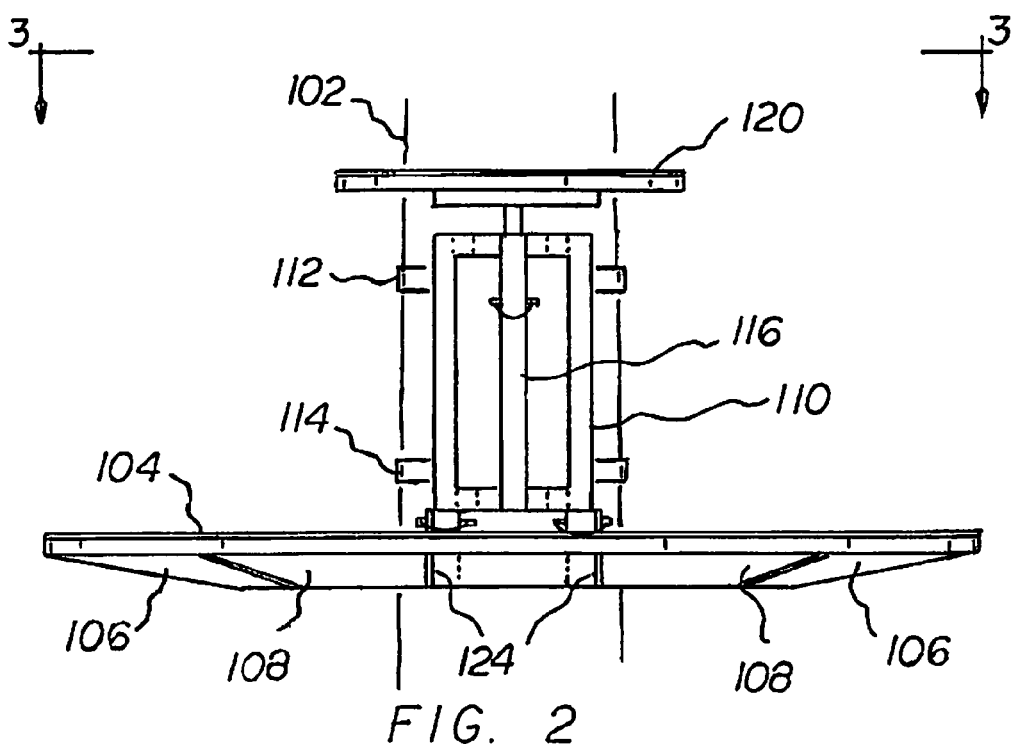
FIG. 2 is a front view of the hunting tree stand.

Referring now to FIG. 2, the decking 104 is supported by a plurality of cantilevered structural members that radiate generally out from a backbone 110 secured to the tree 102. In a particular embodiment, the cantilevered structural members include a pair of assemblies of structural supports, where each assembly is disposed on opposing sides of the backbone 110. For example, each assembly may include a side support member 106 that is generally perpendicular to a front support member 124, and a middle support member 108 is disposed at a generally forty-five degree angle between side support member 106 and the front support member 124. The combination of the decking 104 and support members 106, 108, 124 is referred herein as the platform for the hunting tree stand 100. The decking 104 is supported solely by the cantilevered supports.

The backbone 110 may be secured to the tree 102 using an upper strap 112 and a lower strap 114. In use, one end of the straps 112, 114 are secured to one end of the backbone 110 using a S-hook, for example, and a second end of the straps 112, 114 is wrapped around the tree 102 and secured to the opposing side of the backbone 110. Adjustment plates 150 are disposed on a proximate end of each of the front support members 124. At a lower end of the adjustment plates 150 is a pin 154 that allows the platform to rotate relative to the backbone 110. In addition, a plurality of adjustment apertures 160 are disposed in a curvilinear pattern on the adjustment plates 150, where the plurality of adjustment apertures 160 are positioned so that an angle of the decking 104 to the backbone 110 can be adjusted relative to the backbone 110 by rotating the decking 104 (or platform) downwards or upwards and inserting an adjustment pin 152 through a desired adjustment aperture 160 and the lower end of the backbone 110.

Figure 3:
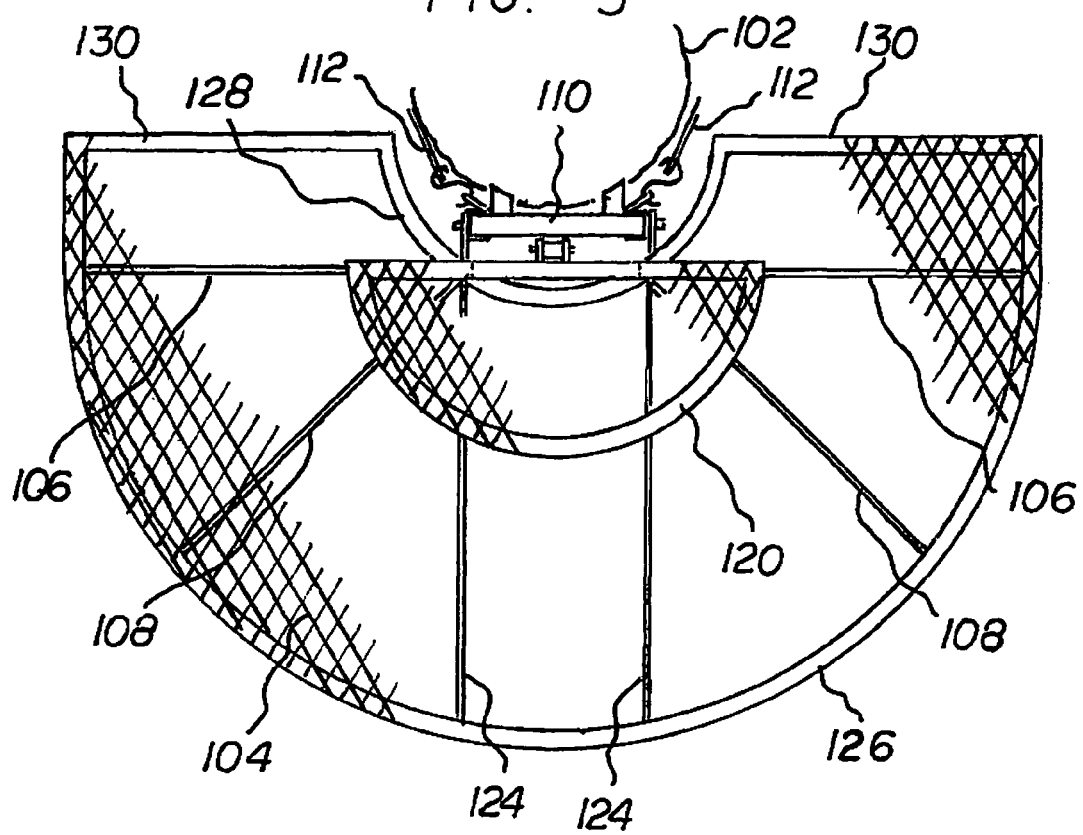
FIG. 3 is top view of the hunting tree stand.

Referring now to FIG. 3, the position of the support members 106, 108, 124 relative to one another is shown. The support members 106, 108, 124 radiate from an inner radial support beam 128 having a generally arc shape outwards to an outer radial support 126, which has a larger diameter than the inner radial support beam 128. An end support 130 secures the respective ends of the inner radial support beam 128 and the outer radial support beam 126 to each other. The seat 120 has a similar shape to the structure of the platform.

Figure 4:
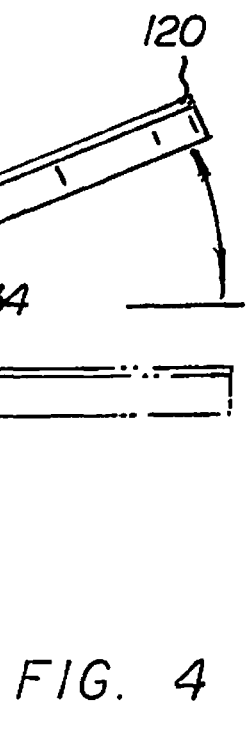
FIG. 4 is a partial detail view of a seat assembly of the hunting tree stand.

The seat 120 shown in FIG. 4 is configured to rotate about a seat hinge 132 that allows the seat to be rotated up and over the seat post 118 to a rear side of the backbone 110 to be folded and stowed. In use, a seat stop 134 serves the hold the seat 120 in a generally horizontal plane. The height of the seat 120 relative to the decking 104 is adjusted using a plurality of seat height adjustment apertures 136 disposed on the seat post 118. The decking 104 and/or seat 120 may be comprised of diamond mesh or other suitable material. The seat post 118 is moved to the desired height within seat sleeve 116 and a seat height pin 138 is inserted through the seat height adjustment aperture 136 to hold the seat 120 at the desired height. Also shown in FIG. 4 is a pair of upper strap tabs 140 that extend out from the backbone 110. The upper strap tab 140 includes a strap aperture 142 that allows an S-hook to be inserted through to hold the backbone 110 to the tree 102 as described above. A similar strap tab is included on an opposing side of the backbone 110 in addition to a pair of lower strap tabs 146 are similarly included on the lower end of the backbone 110.

Figure 5:
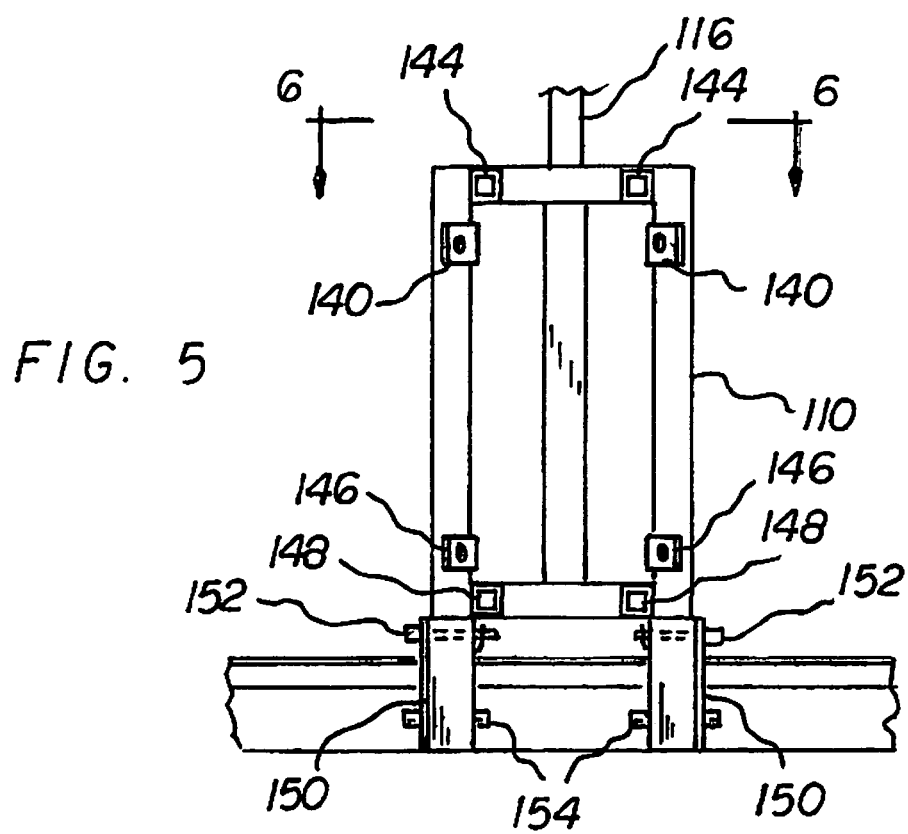
FIG. 5 is a partial rear view illustrating a backbone of the hunting tree stand.
Figure 6:
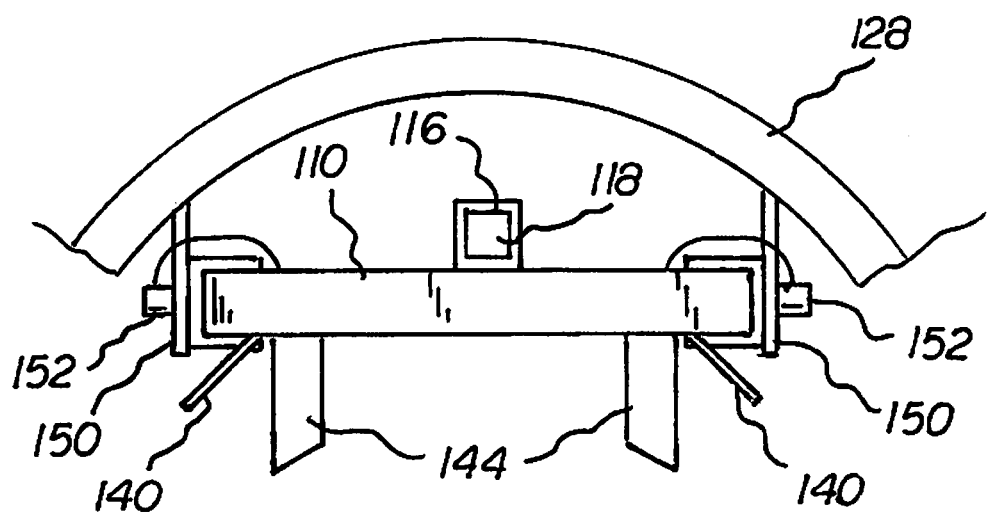
FIG. 6 is a partial top view of the hunting tree stand.

A partial rear view of the hunting tree stand 100 is shown in FIGS. 5 and 6, which illustrates a location of upper tree spikes 144 and lower tree spikes 148 disposed on a rear side of the backbone 110. The tree spikes 144, 148 allow the backbone 110 to grip the tree 102 as a hunter is standing on the decking 104 and a force is applied to the straps 112, 114 on an opposing side of the tree 102.

The hunting tree stand 100 is configured to be folded flat to be stored and easily transported. As illustrated in FIG. 7, the seat 120 is rotated up and over the backbone 110 using seat hinge 132 so that it lays flat against the backbone 110. Then the adjustment pin 152 can be removed so that the backbone 110 can rotate about pin 154 and be folded up and under the decking 104 so that the tree stand 100 is folded flat. To assemble the tree stand, the above steps are reversed so that the tree stand 100 can be installed on the tree 102.

An additional feature of the tree stand is shown in FIG. 8, where the outer radial support 126 may include a plurality of pole receivers 156 for receiving a plurality of vertical poles 158. The poles are configured to support a top railing 170, where the top railing may be used as an additional safety feature and also for draping camouflage material to further conceal the hunter in the tree stand 100.

Figure 9:
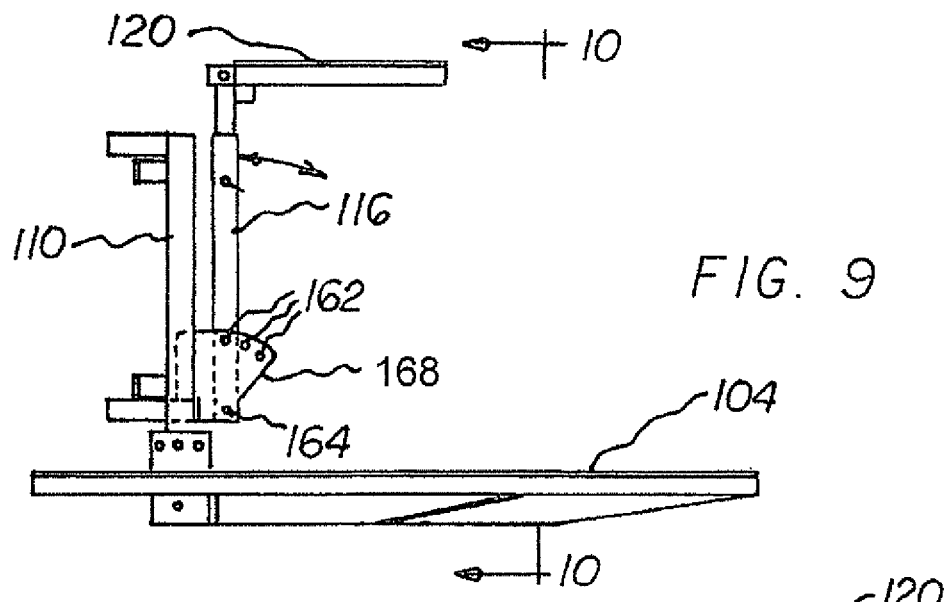
FIG. 9 is an elevational view of a particular illustrative embodiment of the hunting tree stand with an adjustable seat post.
Figure 10:
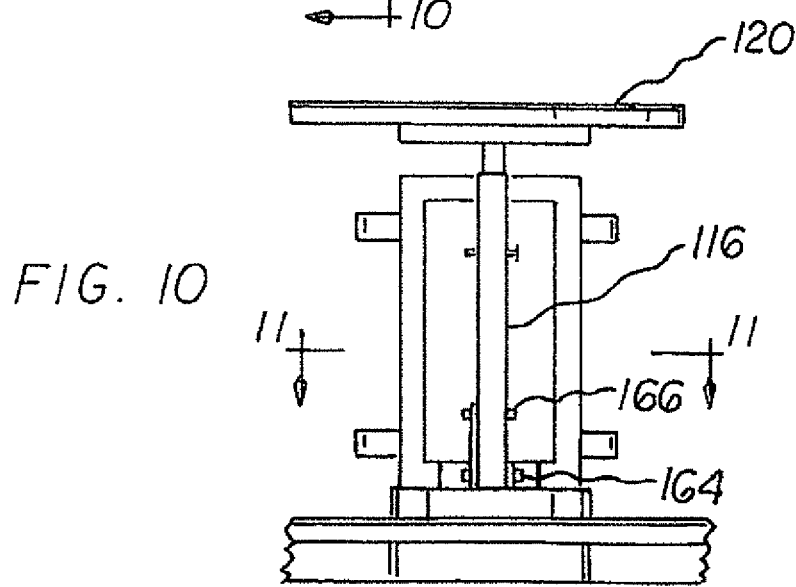
FIG. 10 is a front view of the hunting tree stand shown in FIG. 9.
Figure 11:
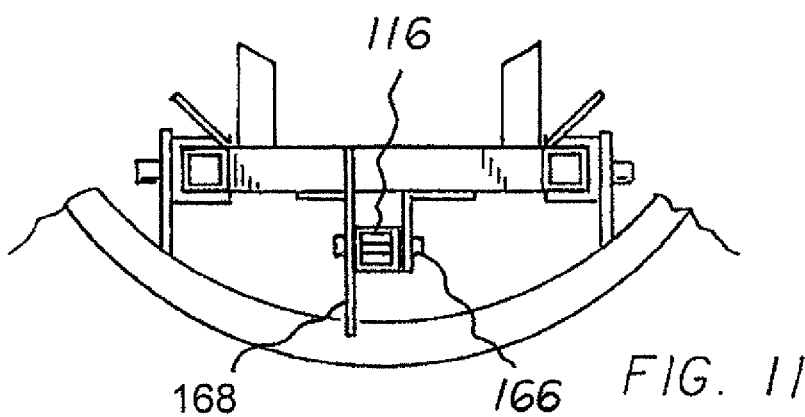
FIG. 11 is a partial top view of the hunting tree stand shown in FIG. 10.

Referring now to FIGS. 9-11, the hunting tree stand may include a seat adjustment plate 168 secured to the seat post 116. A plurality of seat adjustment apertures 162 are disposed in a curvilinear pattern on the seat adjustment plate 160 so than an angle of the seat 120 relative to the backbone 110 can be adjusted by rotating the seat post 116 downwards or upwards about seat post pin 164 and inserting a seat adjustment pin 166 through a desired seat adjustment aperture 162.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A hunting tree stand, the hunting tree stand comprising:
a backbone configured to be secured directly to a tree, the backbone having an upper end and a lower end;
a cantilevered front support member having a first end and a second end;
an adjustment plate having a plurality of adjustment apertures disposed in a curvilinear pattern thereon, and the adjustment plate fixed to the first end of the cantilevered front support member positioned adjacent to the lower end of the backbone;
a first pin securing the first end of the cantilevered front support member to the lower end of the backbone through a lower portion of the adjustment plate, the cantilevered front support member extending outwardly from the lower end of the backbone and configured to rotate about the first pin to a desired angle relative to the backbone;
an adjustment pin configured to fix the cantilevered front member at the desired angle relative to the backbone by passing through one of the plurality of adjustment apertures and a backbone aperture at a position adjacent to an upper portion of the adjustment plate and the lower end of the backbone;
a decking secured over the cantilevered front support member to provide a surface for a hunter to stand when the tree stand is in use on the tree, the decking being directly connected to the cantilevered front support member extending outwardly from the backbone when the tree stand is in use on the tree, wherein the desired angle is configured to be adjusted by rotating the cantilevered front support member about the first pin in a direct downwardly away from the backbone and upwardly toward the backbone; and
a seat pivotally secured on an upper end of a seat post, a lower end of the seat post being pivotally secured to the lower end of the backbone, the seat positioned above the decking and configured for the hunter to sit on as feet of the hunter rest on the decking when the tree stand is in use on the tree, wherein a desired seat angle defined between the seat with respect to the backbone is configured to be adjusted by rotating the seat post downwardly away from the upper end of the backbone and upwardly toward the upper end of the backbone without moving the backbone and the cantilevered support member, and wherein the seat is configured to rotate at least 90 degrees with respect to the seat post.

2. The hunting tree stand of claim 1, the decking capable of extending around the tree.

3. The hunting tree stand of claim 1, the decking capable of extending half way around the tree.

4. The hunting tree stand of claim 1, the decking capable of extending a portion around the tree.

5. The hunting tree stand of claim 1, further comprising a plurality of pole supports configured to form a railing around the decking, wherein the railing can be used for draping camouflage therefrom.

6. The hunting tree stand of claim 1, wherein the decking comprises a middle support disposed approximately 45 degrees between a side support member and the cantilevered front support member.

7. The hunting tree stand of claim 1, further comprising:
a seat adjustment plate having a plurality of seat adjustment apertures disposed in a curvilinear pattern thereon, and the seat adjustment plate fixed to the backbone;
a seat post pin securing a lower end of the seat sleeve to the backbone through a lower portion of the seat adjustment plate, and the seat sleeve configured to rotate about the seat post pin to a desired orientation;
a seat adjustment pin configured to fix the seat sleeve at the desired orientation of the seat sleeve adjustment plate and the seat sleeve so that the desired seat angle is configured to be adjusted by rotating the seat sleeve downwardly and upwardly, and the desired seat angle is configured to be fixed by inserting the seat adjustment pin through a desired seat adjustment aperture of the plurality of seat adjustment apertures.

8. The hunting tree stand of claim 7, wherein the backbone is configured to rotate to lay against the decking.

9. The hunting tree stand of claim 7, further comprising:
a seat adjustment plate having a plurality of seat adjustment apertures disposed in a curvilinear pattern thereon, and the seat adjustment plate fixed to the backbone;
a seat post pin securing a lower end of the seat sleeve to the backbone through a lower portion of the seat adjustment plate, and the seat sleeve configured to rotate about the seat post pin to a desired orientation;
a seat adjustment pin configured to fix the seat sleeve at the desired orientation of the seat sleeve through an upper portion of the seat adjustment plate and the seat sleeve so that the desired seat angle is configured to be adjusted by rotating the seat sleeve downwardly and upwardly, and the desired seat angle is configured to be fixed by inserting the seat adjustment pin through a desired seat adjustment aperture of the plurality of seat adjustment apertures.

10. The hunting tree stand of claim 7, further comprising a plurality of tree spikes disposed on a rear side of the backbone and configured to grip the tree.

11. The hunting tree stand of claim 1, further comprising:
a pair of upper strap tabs that extend outwards from a rear side of the backbone, wherein each upper strap tab having an aperture configured to receive an end of an upper strap used to secure the upper strap around the tree; and
a pair of lower strap tabs that extend outwards from the backbone, wherein each lower strap tab having an aperture configured to receive an end of lower strap used to secure the lower strap around the tree.

12. The hunting tree stand of claim 7, the seat post further comprising a plurality of seat height adjustment apertures so that a height of the seat can be adjusted by moving the seat post upwards or downwards within the seat sleeve and inserting a seat height adjustment pin.

13. The hunting tree stand of claim 7, further comprising a seat stop configured to hold the seat in a horizontal orientation.

* * * * *